Feb. 15, 1949.  A. M. FELLER  2,461,635
MAGNETOSTRICTIVE PRESSURE INDICATOR
Filed Oct. 6, 1944  3 Sheets-Sheet 1
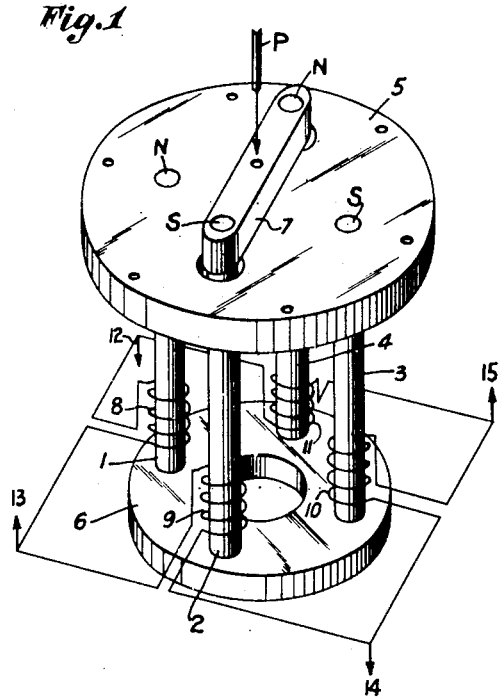
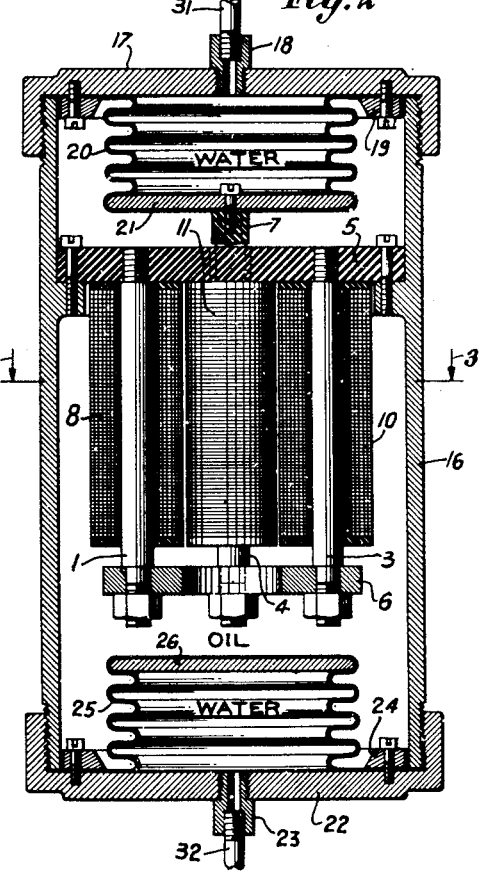
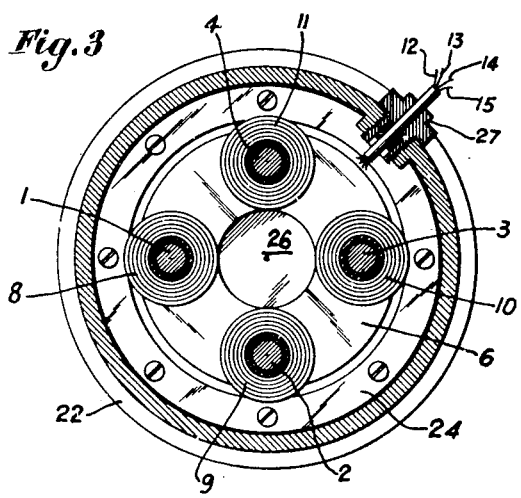
INVENTOR:
Anton M. Feller,
BY
Edward L. Mueller
ATTORNEY

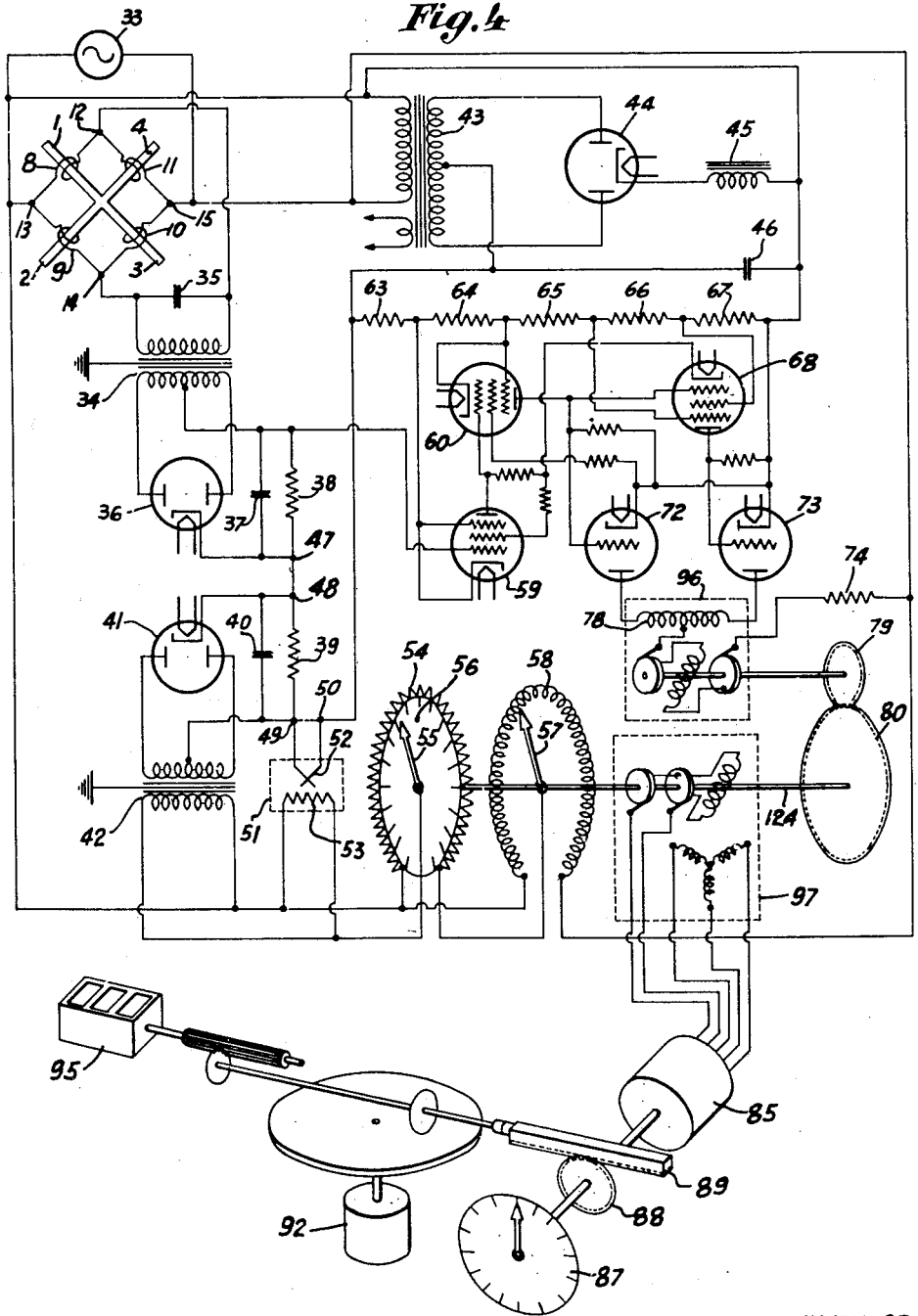

Patented Feb. 15, 1949

2,461,635

UNITED STATES PATENT OFFICE 2,461,635

MAGNETOSTRICTIVE PRESSURE INDICATOR

Anton M. Feller, Rahway, N. J., assignor to Control Instrument Company, Inc., Brooklyn, N. Y., a corporation of New York Application October 6, 1944, Serial No. 557,528

6 Claims. (Cl. 73—398)

This invention relates to improvements in indicating devices and has particular reference to instruments for the measurement of mechanical, hydraulic or aerodynamic forces.

An object of the invention is to utilize, in a practical and an effective manner, the magnetostrictive properties of certain materials to translate or convert applied forces into electrical potentials which can be conveniently transmitted and measured.

Another object is to provide for the continuous indication or recording of measurements which may be duplicated at a plurality of remote points by means of follow-ups.

A further object is to readily effect changes in the mathematical ratios of the measured forces from square law or other geometric ratios into linear ratio, or vice versa.

A further object is to correctly account for and cancel the influence of certain variables or secondary forces which otherwise would adversely affect the accuracy of desired measurements.

A further object is to eliminate possible errors in measurement due to certain characteristics of the magnetostrictive elements employed in securing such measurement.

A still further object is to provide an improved unit of simple and practical construction wherein magnetostrictive elements are so arranged that when subjected to action of extraneous forces certain of said elements will be compressed while others will be placed under tension to create an unbalance capable of being accurately measured.

The above and other objects will appear more clearly from the following detailed description when taken in connection with the accompanying drawings which illustrate preferred embodiments of the inventive idea; but it is to be expressly understood that said drawings are employed merely for the purpose of describing the invention as a whole and not to define the limits thereof, reference being had to the appended claims for this purpose.

In the drawings:

Fig. 1 is an isometric diagram illustrating the basic assembly of a magnetostrictive unit employed in connection with the invention.

Fig. 2 is a vertical section through a complete unit specifically designed for the transmission of hydraulic pressures as developed, for example, by conventional Pitot or Venturi tubes.

Fig. 3 is a transverse section on the line 3—3 of Fig. 2.

Figure 5:
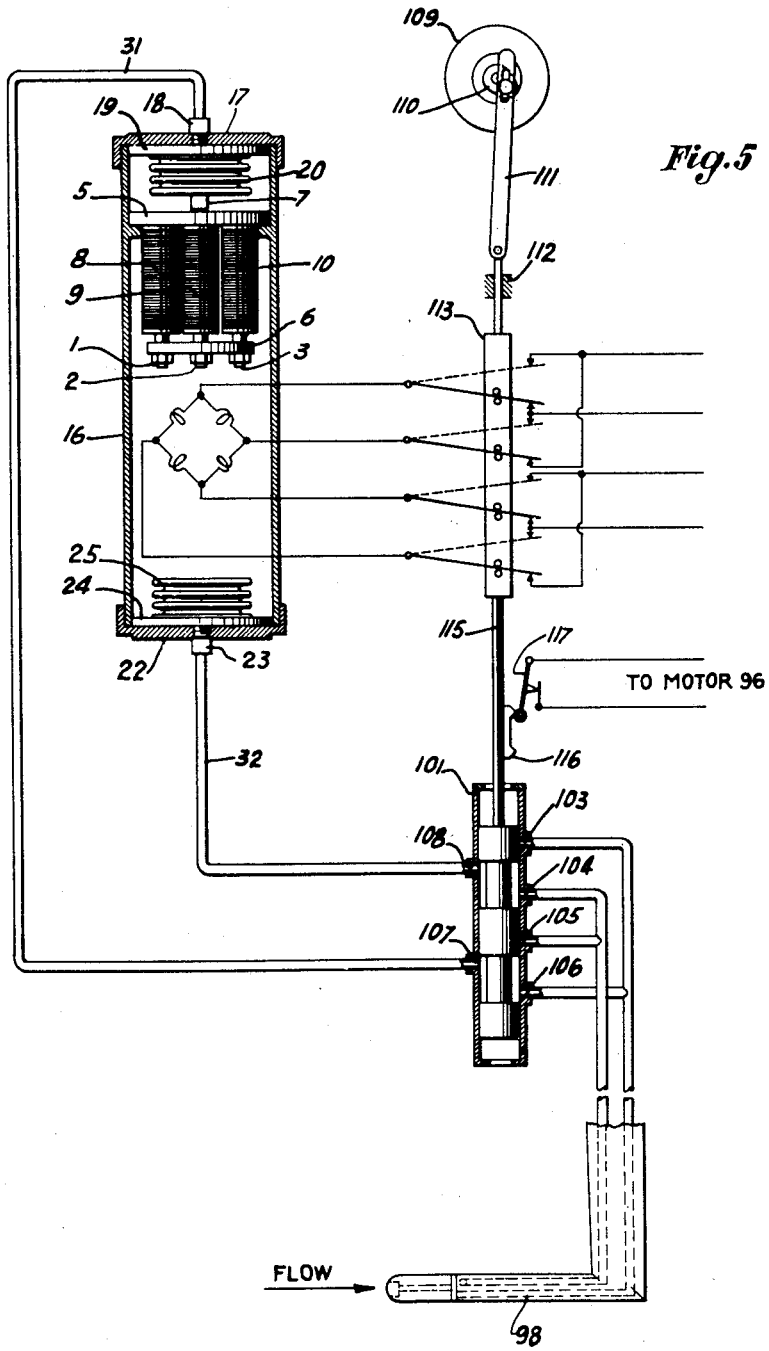

Fig. 4 is a diagrammatic view of the magnetostrictive unit and accompanying circuit embodying electronic and follow-up elements suitable for the interpretation and transmission of Pitot tube pressures in terms of a ship's speed and distance traveled, and Fig 5 is a diagrammatic view of apparatus illustrating one manner of correcting certain errors due to the fatigue effects of some magnetostrictive materials.

The present invention deals with the use of magnetic materials and takes advantage of the Villari effect thereof, that is, the change in the magnetization due to longitudinal stress. In an investigation covering various nickel-iron and cobalt-iron alloys, carbon-steels and nickel, it was found that pure nickel displays the largest and most linear effect. Alternating current, partly in conjunction with superimposed direct current fields, was used for magnetization and to increase the magnitude of the indication, the material was used in a system comprising members under compression and under tension, incorporating a system of energizing coils forming an impedance bridge.

As shown in Fig 1, the above principle may be carried out by the provision of a system of four elements such as rods 1, 2, 3 and 4 of magnetostrictive material supported from a rigid disc 5 or other suitable body made of non-magnetic material such as Bakelite or similar non-conductive substance. The two rods 1 and 3 are secured to said disc at their upper ends, while the opposite extremities thereof are connected to a support 6 in the form of a ring of steel to which are secured the lower ends of the rods 2 and 4, the upper ends of which project through openings in said disc 5. Said upper ends of the rods 2 and 4 are interconnected by a yoke member 7 also of non-magnetic material. The rods 1, 2, 3 and 4 are made closely alike and preferably of pure nickel, although for some special applications it may be possible to select and utilize other magnetostrictive materials or a combination of different metals such as hereinbefore mentioned. From the foregoing, it is evident that if a force in the direction of the arrow P is applied against the yoke 7, this will result in the production of compression in the rods 2 and 4 and of tension in the rods 1 and 3.

The four rods 1, 2, 3 and 4 are magnetically energized by four coils 8, 9, 10 and 11. These coils are suitably supported to have ample clearance in the center so as not to cause the slightest interference with any longitudinal displacement of the said rods. The coils are interconnected in a bridge-circuit in such a manner that if a current is impressed on the corners 13 and 15 of the bridge, the upper ends of the rods 1 and 4 are of the same magnetic polarity and the upper ends of rods 2 and 3 of the opposite polarity. This is indicated in Fig. 1 by the magnetic polarity symbols N and S, although alternating current of low frequency, approximately 60 cycles per second, is used for the operation of the device. Disregarding the influence of gravitational forces, the system will form a balanced impedance bridge, when no external force P or other mechanical force is applied, because the size and spacing of the rods 1, 2, 3 and 4 as well as the size and turn-ratios of the coils 8, 9, 10 and 11 are uniform. Due to the magnetostrictive properties of the materials used, the bridge will, however, be unbalanced when forces acting in opposition upon the pairs of rods 1 and 3, and 2 and 4 are applied. It has been found by numerous experiments that for pure nickel the amount of resulting unbalance is closely linearly proportional to the acting mechanical forces. The unbalance voltage resulting across the corners 12 and 14 may be measured by any conventional means although some special provisions for the measurement of this voltage will be described later. The sensitivity of the bridge circuit is high because the impedance of opposite arms of the bridge is varied in opposite directions.

It is possible, without departing from the spirit or scope of the invention, to have only one or two arms of the bridge varied by magnetostrictive influences, replacing the other bridge-arms by any other fixed or variable impedance.

It has been found that under certain conditions the linearity of the unbalance may be improved by superimposing a constant magnetic field upon the induced alternating current flux. This may be conveniently achieved by providing separate and independent windings on the four coils 8, 9, 10 and 11 and by energizing these windings with direct current. Also the amount of magnetic saturations is of influence.

The device as thus far described forms the basic unit of other more specialized applications and in describing various applications of operating, indicating and transmitting apparatus, this device will be referred to as the "magnetostrictive unit." Compared with some other methods of translating mechanical forces into electrical potentials, the present procedure has the advantage that it requires mechanical displacements of microscopic magnitude, and it is therefore suitable for the accurate interpretation of forces covering a very large range of magnitudes.

In Fig. 2, there is shown a magnetostrictive unit comprising a liquid-tight casing 16 suitable for the transmission of hydraulic pressure differentials as may, for instance, be derived from Pitot tubes or similar devices. Said casing is provided with removable end closures 17 and 22 having nipples 18 and 23 mounted thereon for connection, respectively, to the pipes 31 and 32 through which the hydrodynamic and static pressures are conveyed into the casing. By means of a ring 19, a bellows 20 and its end plate 21 are attached to the inside surface of the closure 17 to seal off communication between the remainder of the interior of the housing and the inlet 18, and a ring 24 is employed to similarly secure a bellows 25 and its plate 26 to the closure 22. The rigid support 5 is fastened in the casing in a position transversely thereof and adjacent the bellows 20, the plate 21 of which carries the yoke member 7 directly above said support. The movable support 6 is arranged adjacent the bellows 25 and the various rods 1 to 4 are connected to the two supports 5 and 6 in the manner described in connection with Fig. 1. The coils 8, 9, 10 and 11 through which the rods extend are carried by the disc 5 and the leads 12, 13, 14, and 15 of said coils forming part of the impedance bridge are extended to the exterior of the casing 16 through a hermetically sealed bushing 27 or any other suitable means. The interior of the casing, including the area surrounding the bellows 20 and 25, is filled with oil or other insulating liquid of negligible compressibility. Due to the relative incompressibilty of such fluids, it will be understood that in the system shown herein the difference between the dynamic and static pressures in the two bellows will act upon the yoke 7 to tension the rods 1 and 3 secured to the supporting disc 5, while compression will be applied to the rods 2 and 4 carried by the ring 6 and connected to said yoke.

If $p_t$ denotes the dynamic and $p_s$ the static pressures at the Pitot tube, and if $\rho$ represents the density of the sea-water; V the water speed of the ship; and $d_E$ the effective diameter of the bellows 20 and 25, the force P acting to tension the rods 1 and 3 will be equal to the force of compression acting upon the rods 2 and 4 and the force P acting upon each pair of the rods will be:

$$P=(p_t-p_s)\cdot\frac{d_E^2\pi}{4}=V^2\cdot K\cdot\frac{\rho}{2g}\cdot\frac{d_E^2\pi}{4}$$

K represents a constant, which, as well known in the art, may for well-designed Pitot tubes closely approach unity.

It is evident from the foregoing that the incremental unbalance of the bridge circuit in the magnetostrictive unit will be proportional to the square of the ship's velocity.

On account of the stiffness of the rods 1, 2, 3 and 4 and the method of their rigid support, the displacement produced by the acting forces will be of microscopic magnitude and consequently any error due to stiffness in elongating the bellows 20 and 25 will be negligible.

Fig. 4 shows, in diagrammatic form, one of several possible methods for using the unbalance resulting in the magnetostrictive unit to indicate a ship's speed and distance traveled and also shows means for correcting some errors of measurement resulting from secondary influences.

A source 33 of alternating current of low frequency supplies energy to the magnetostrictive unit and to a system of electronic rectifiers and amplifiers and to electro-mechanical follow-ups. The voltage originating from said source may be suitably stabilized, but it will be apparent from the following description that the influences of voltage changes largely cancel.

The unbalance voltage of the bridge is impressed upon the primary of a small, approximately 1 to 8 ratio, insulating transformer 34. A small condenser 35 acts as a shunt to by-pass harmonics. The output of the transformer 34, rectified by the small, full-wave vacuum tube rectifier 36, develops, across the condenser 37 and the resistor 38 of about 1 megohm, voltage corresponding approximately to the alternating current peak value. The voltage developed across the resistor 38 is opposed by a corresponding voltage produced by the transformer 42 and the rectifier 41, condenser 40 and resistor 39, which in their characteristics closely correspond to their counterparts 34, 36, 37 and 38.

A small direct current motor 96 is so controlled by an electronic tube circuit as to influence the input potential of the transformer 42 so that the voltages, developed by the two rectifying systems in series opposition automatically cancel to zero.

It is a well known characteristic of vacuum tube rectifiers that so-called contact potentials are developed as the result of the acceleration of the electrons at the hot cathode, even if there is no input potential present. The above used method of series opposition by similar rectifying systems automatically cancels the influence of contact potentials. If desired, the two rectifiers 36 and 41 may be so interconnected that one half of each tube is used for one system and the other halves for the other systems, thus minimizing the influence of tube characteristics. It also will be apparent that since both rectifying systems are supplied from the same source 33, influences of voltage changes, wave-form and frequency will largely cancel.

A power transformer 43 supplies a rectifying system formed by the tube 44, the filter choke 45, filter condenser 46 and a voltage divider formed by the resistors 63, 64, 65, 66 and 67. The high-mu pentodes 59 and 60 form a direct coupled amplifier. Superimposed upon a suitable bias voltage supplied by the resistor 63, the series opposition voltage of the resistor system 38 and 39 is impressed upon the control grid of the pentode 59. At the points 49 and 50 of this circuit, a thermocouple 52 may be inserted. The functions of this thermocouple will be explained later.

According to principles well known in the art, the output of the direct coupled amplifier by means of an auxiliary, properly biased tube 68 will cause one or the other or both of two Thyratrons 72 and 73 to conduct and, correspondingly, to energize the split field 78 of the motor 96, thereby causing clockwise or counterclockwise rotation, or standstill of the said motor. The resistor 74 limits the current through the motor to a safe value at standstill. Rotation of the motor 96 by means of the gears 79 and 80, is transmitted to the shaft 124 of a self-synchronous generator 97, on the shaft of which is also mounted a variable transformer 58, a potentiometer 54 and a speed indicating pointer 55 and its dial 56. Rotation of the shaft of the generator 97 is limited to somewhat less than 360°.

Voltage supplied by the A. C. generator 33 is impressed upon the end terminals of the variable transformer 58 and the voltage developed at the sliding contact 57 of the transformer 58 will be proportional to the angular position of the contact 57. This linearly variable voltage is, in turn, impressed upon the end terminals of the potentiometer 54. Said potentiometer supplies the primary of the transformer 42 and since this high impedance load is of small magnitude it will be understood that the voltage acting upon the transformer 42 will be nearly proportional to the square of the angular rotational increments of the shaft 124.

Since the forces acting upon the magnetostrictive unit are proportional to the square of the ship's velocity and cause a linearly proportionate voltage at the resistor 38 which in turn is opposed by an equal voltage at the resistor 39, it will be evident from the foregoing that the speed dial 56 may be linearly calibrated in terms of the ship's speed.

The angular position of the self-synchronous generator 97 may be duplicated in the customary manner in a plurality of locations.

A secondary self-synchronous motor 85 may be used to indicate the speed on the dial 87 and to operate a gear 88 and a gear rack 89 which acts upon a conventional integrating device driven by the constant speed motor 92. In this way the counter 95 may be used to register the distance traveled.

After having thus explained the fundamental operations of the system, it will be understood that the proposed method is a potentiometric null-method and does not amplify the signal. The amplifier only serves to increase the sensitivity to a high degree and to make the speed of the response proportional to the error.

It has been stated previously that the output of the magneto-strictive unit can be made to approach a linear ratio very closely. Any slight lack of linearity may be removed by providing a suitable taper of the potentiometer 54, or by the insertion of a load resistor 53.

One peculiarity of the proposed magnetostrictive material consists in a slight temporary instability referred to as fatigue. When the maximum force is impressed upon the rods for a prolonged period, the output will not return to the original magnitude immediately upon removal of this load, but will remain about 1.5% higher for a period of about twenty minutes. About one-half of this effect disappears after six minutes. The effect can be made smaller by making the cross-section of the rods relatively large, thus reducing the unit stress.

Another method of minimizing this effect consists in the use of the thermocouple 52 which is in thermoconductive contact with the special load resistor 53 and enclosed in a heat insulating housing 51. If the ship proceeds at a high rate of speed for a prolonged period the heat input into the resistor 53, which is proportional to the square of the velocity, will be relatively large and the voltage generated by the thermocouple 52 will add to the voltage of the output of the magnetostrictive unit. On the other hand, when the ship slows down the rate of heat dissipation of the housing 51, which is made to approximate the time-rate of the fatigue effect will be able to maintain the speed indication at a fairly correct value, regardless of fatigue. Ambient temperature will have little influence because this will equally influence the "hot" and "reference" junctions of the couple. It is obvious that while this method is able to overcome the influence of fatigue to a great extent, the compensation cannot be perfect.

There is shown in Fig. 5 an alternate arrangement which provides almost complete compensation for the fatique effect. This method consists in cyclic reversals of the dynamic and static Pitot tube connections and simultaneous reversals of the bridge connections. A continuously running gear reduced motor 109 rotates at a slow speed of about two revolutions per minute. A crank 110 acting upon a slotted connecting rod 111 causes reciprocating motion with a certain amount of dwell in the end positions. Linked to the connecting rod 111 and suitably guided by 112 is a contacting device 113 and a valve 101 with multiple ports 103, 104, 105, 106, 107 and 108. As the static and dynamic Pitot tube pressures are periodically reversed, the forces acting upon the two pairs of rods 1, 3 and 2, 4 of the magneto-strictive unit are also reversed, while the connections to the follow-up systems are changed in such a manner as to maintain the speed indication uniform. In order to avoid possible erratic behavior of the follow-up motor 96 during the changeover, the rod 115 connecting the valve 101 with the device 113 carries a double wedge 116 for engagement with a contact 117 for automatically disconnecting said motor while the contact device 113 is in mid-position.

A number of possible errors are inherent in the construction of Pitot tubes and may be classified as square law and linear errors. Square law influences are, for instance, changes in the salinity and temperature of the sea-water and, with some types of Pitot tubes, the effect of angular misalignment due to pitching of the vessel. Linear influences are the effects of rolling and some effects of ambient temperature.

In the circuit shown in Fig. 4, square law influences may be compensated for by introducing corrective voltages between the points 47 and 48 and linear influences may be canceled by suitably varying the input into the variable transformer 58.

What is claimed is:

1. A magnetostrictive unit comprising a housing having opposed liquid inlets, bellows in said housing having interior communication with said inlets for receiving pressure therethrough, a rigid support in said housing between said bellows, a movable support, a yoke member carried by one of said bellows, a plurality of magnetostrictive rods certain of which are fixed to said rigid support and connected to said movable support while others of said rods are connected to the latter support and said yoke member, and energizing coils for said rods carried by said rigid support.

2. A magnetostrictive unit comprising a housing having inlets, pressure responsive elements in said housing and having interior communication with said inlets for receiving pressure therethrough, said responsive elements sealing off communication between said inlets and the remaining portion of the interior of said housing, a plurality of magnetostrictive elements mounted in the latter portion of said housing, means to mount said magnetostrictive elements so that certain of them will be compressed by pressure of said responsive elements and others tensioned thereby, and means to magnetically energize said magnetostrictive elements.

3. A magnetostrictive unit comprising a housing having inlets, pressure responsive elements in said housing and having interior communication with said inlets for receiving pressure therethrough, said responsive elements sealing off communication between said inlets and the remaining portion of the interior of said housing, said remaining portion being filled with a liquid, a plurality of magnetostrictive elements mounted in the latter portion of said housing, means to mount said magnetostrictive elements so that certain of them will be compressed by pressure of said responsive elements and others tensioned thereby, and means to magnetically energize said magnetostrictive elements.

4. In a measuring system in which magnetically energized magnetostrictive elements included in a normally balanced bridge circuit having an output connection are subjected to the forces of compression and tension to unbalance said circuit, a source of electrical energy for said bridge circuit, a variable transformer connected to said source, a potentiometer upon which the variable voltage at said transformer is impressed, a second transformer the primary of which is supplied by said potentiometer, a third transformer upon which unbalanced voltage in said output connection is impressed, and rectifying circuits including resistors in series opposition connected to the secondaries of said second and third transformers.

5. In a measuring system in which magnetically energized magnetostrictive elements included in a normally balanced bridge circuit having an output connection are subjected to the forces of compression and tension to unbalance said circuit, a source of electrical energy for said bridge circuit, a variable transformer connected to said source, a potentiometer upon which the variable voltage at said transformer is impressed, a second transformer the primary of which is supplied by said potentiometer, a third transformer upon which unbalanced voltage in said output connection is impressed, rectifying circuits including resistors in series opposition connected to the secondaries of said second and third transformers, a thermocouple connected to said rectifying circuits, and a resistor in thermoconductive contact with said thermocouple and connected to the primary of said second transformer.

6. The combination with a pressure measuring and indicating system comprising magnetically energized magnetostrictive elements, a normally balanced bridge circuit including said elements, and having a pair of output terminals, bridge unbalance detecting and indicating means connected to said terminals, and means for applying forces of compression to some and tension to others of said magnetostrictive elements to unbalance said bridge; of a multiple valve means for cyclically and reversibly controlling the direction of application of said forces of compression and tension to said magnetostrictive elements, actuating means for the cyclic operation of the aforesaid valve means, and switching means operated by said actuating means and interposed between said bridge output terminals and said bridge unbalance detecting means for reversing the order of connection therebetween simultaneously with the reversal of the applied forces to said magnetostrictive elements.

ANTON M. FELLER.

REFERENCES CITED

The following references are of record in the file of this patent:

UNITED STATES PATENTS

| Number | Name | Date |
| --- | --- | --- |
| 1,666,680 | Buckley | Apr. 17, 1928 |
| 1,906,551 | De Forest | May 2, 1933 |
| 2,053,560 | Janovsky | Sept. 8, 1936 |
| 2,338,732 | Nosker | Jan. 11, 1944 |
| 2,376,156 | Kuehni | May 15, 1945 |

FOREIGN PATENTS

| Number | Country | Date |
| --- | --- | --- |
| 442,441 | Great Britain | Feb. 3, 1936 |